United States Patent
Katsumata

(10) Patent No.: US 10,896,124 B2
(45) Date of Patent: Jan. 19, 2021

(54) RECORDING CONTROL APPARATUS, CONTROL METHOD THEREOF AND NON-TRANSITORY COMPUTER-READABLE STORAGE MEDIUM

(71) Applicant: CANON KABUSHIKI KAISHA, Tokyo (JP)

(72) Inventor: Kohei Katsumata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/550,527

(22) Filed: Aug. 26, 2019

(65) Prior Publication Data

US 2020/0073796 A1  Mar. 5, 2020

(30) Foreign Application Priority Data

Aug. 30, 2018 (JP) ................................. 2018-161163
Aug. 30, 2018 (JP) ................................. 2018-162101

(51) Int. Cl.
*G06F 12/02* (2006.01)
(52) U.S. Cl.
CPC .. *G06F 12/0246* (2013.01); *G06F 2212/7202* (2013.01)
(58) Field of Classification Search
None
See application file for complete search history.

(56) References Cited

U.S. PATENT DOCUMENTS

| | | | |
|---|---|---|---|
| 6,141,044 A * | 10/2000 | Anderson | H04N 1/2112 348/231.6 |
| 8,228,395 B2 * | 7/2012 | Chitnis | H04N 1/2137 348/222.1 |
| 9,066,062 B2 * | 6/2015 | Otani | G11B 20/10527 |

OTHER PUBLICATIONS

"SD Specifications Part 1, Physical Layer, Simplified Specification, Version 5.00", Technical Committee, SD Card Association, Aug. 10, 2016.

* cited by examiner

*Primary Examiner* — Brian R Peugh
(74) *Attorney, Agent, or Firm* — Venable LLP

(57) ABSTRACT

A recording control apparatus comprises a recording controlling section which records an image shot by an image capturing section to a recording medium, wherein the recording controlling section, when a plurality of images that are successively shot by the image capturing section are to be recorded to the recording medium as a plurality of files, executes predetermined processing for enabling recording of the plurality of files to successive areas of the recording medium without using a predetermined command, before starting recording of the plurality of images.

17 Claims, 6 Drawing Sheets

RECORDING CONTROL APPARATUS, CONTROL METHOD THEREOF AND NON-TRANSITORY COMPUTER-READABLE STORAGE MEDIUM

BACKGROUND OF THE INVENTION

Field of the Invention

The present invention relates to a recording control apparatus, a control method thereof and a non-transitory computer-readable storage medium, and specifically relates to technology for recording data to a recording medium.

Description of the Related Art

Recording apparatuses such as a digital camera and a digital video camera that record data such as moving images, still images, sound data, and the like to a recording medium are known. Also, the recorded data is managed, in general, as files by a file system such as FAT16, FAT32, and exFAT.

Also, some recording media support a plurality of writing methods that differ in write speed. A recording apparatus can use different writing methods according to the type of data to be recorded, whether or not the data needs to be recorded in real time, and the like. For example, the recording area of a recording medium is managed in units of AU (Allocation Unit), that is, there are a plurality of areas (AUs). There are methods in which, in high speed writing, pieces of data are successively recorded from the top of an empty AU, and when high speed writing is not needed, pieces of data are recorded in empty areas inside an AU (refer to "SD Specifications Part 1, Physical Layer, Simplified Specification, Version 5.00").

The present disclosure takes into consideration the property of a recording medium that recording data in empty areas in an AU in which data already has been recorded in some portions of the AU takes a longer time than recording data in an empty AU (no data is recorded therein).

That is, as a result of a recording apparatus issuing a write command to the recording medium using an AU as the recording unit, the data can be written into the recording medium at the maximum writing speed. By applying this property, the concept of "speed class" has been proposed. This concept is for assuring the recording apparatus the minimum speed at which data can be written into the recording medium by imposing a restriction on the recording apparatus, the restriction being the way in which an empty AU is retrieved, the empty AU is divided in units of RU (Recording Unit), and writing is performed in units of RU, by making use of the property of an AU. With this, data recording control to perform recording in real time such as moving image recording is made possible.

Also, a video speed class has been proposed as a superordinate concept of the speed class. The video speed class is a concept for realizing assurance of higher performance by imposing further restrictions on the recording apparatus. Specifically, the maximum size of an AU is 512 MB, which is eight times a conventional AU size. Also, a new command called Set Free AU is defined, and additional restrictions are introduced such as that the recording apparatus needs to declare AUs that are to be used to the recording medium in advance, and that commands such as Suspend AU and Resume AU need to be used when RUs in AU are retained. However, when the recording apparatus observes these restrictions, speed assurance is possible with respect to a data amount that is three times that of the conventional speed class.

Moreover, in the video speed class, a concept of multi-stream writing is also introduced. In the conventional speed class, speed can be assured with respect to only single-stream data recording. However, this video speed class is a concept in which recording can be assured with respect to the case where a plurality of files are recorded to one recording medium at the same time, although being recorded in a time-sharing manner.

However, although the technology relating to the improvement of write speed performance is described in the aforementioned document, the description relating to overall processing speed improvement is not given in which processing time for executing restrictions in order to realize the speed improvement is taken into consideration.

Also, it is possible that a free space that could have been used is wasted by performing recording in units of AU, and technology for minimizing the free space to be wasted is not described.

SUMMARY OF THE INVENTION

The present invention has been made in view of the foregoing points, and aims to provide recording technology in which it is possible to suppress the number of times of issuing commands to a minimum, and to avoid the generation of wasted areas in a recording medium.

According to a first aspect of the present invention, there is provided a recording control apparatus comprising: a recording controlling section for recording an image shot by an image capturing section to a recording medium, wherein the recording controlling section, when a plurality of images that are successively shot by the image capturing section are to be recorded to the recording medium as a plurality of files, executes predetermined processing for enabling recording of the plurality of files to successive areas of the recording medium without using a predetermined command, before starting recording of the plurality of images.

According to a second aspect of the present invention, there is provided a control method of a recording control apparatus for recording an image shot by an image capturing section to a recording medium, the control method comprising: executing, when a plurality of images that are successively shot by the image capturing section are to be recorded to the recording medium as a plurality of files, predetermined processing for enabling recording of the plurality of files to successive areas of the recording medium without using a predetermined command, before recording of the plurality of images is started.

According to a third aspect of the present invention, there is provided a non-transitory computer-readable storage medium storing a program which, when read and executed by a computer, caused the computer to execute the steps of a control method of a recording control apparatus for recording an image shot by an image capturing section to a recording medium, the control method comprising: executing, when a plurality of images that are successively shot by the image capturing section are to be recorded to the recording medium as a plurality of files, predetermined processing for enabling recording of the plurality of files to successive areas of the recording medium without using a predetermined command, before recording of the plurality of images is started.

According to the present invention, it is possible to suppress the number of times of issuing commands to minimum, and the generation of wasted areas in a recording medium, while enabling the recording medium to exert its performance.

Further features of the present invention will become apparent from the following description of exemplary embodiments (with reference to the attached drawings).

DESCRIPTION OF THE EMBODIMENTS

Hereinafter, embodiments of the present invention will be described in detail according to the attached drawings.

In the embodiment, an example will be described in which the present invention is applied to an image capturing apparatus that is represented by an interchangeable lens single-lens reflex type digital still camera, serving as an example of a recording control apparatus. However, the invention can also be applied to an apparatus that performs recording to a recording medium such a digital video camera or a device such as a smartphone having an image capturing function. It should be understood that the application to the digital still camera is merely one example. Also, the present invention may also be applied when a processing apparatus that can communicate with an image capturing device having an image capturing function records images shot by the image capturing device.

Configuration of Image Capturing Apparatus

Figure 1:
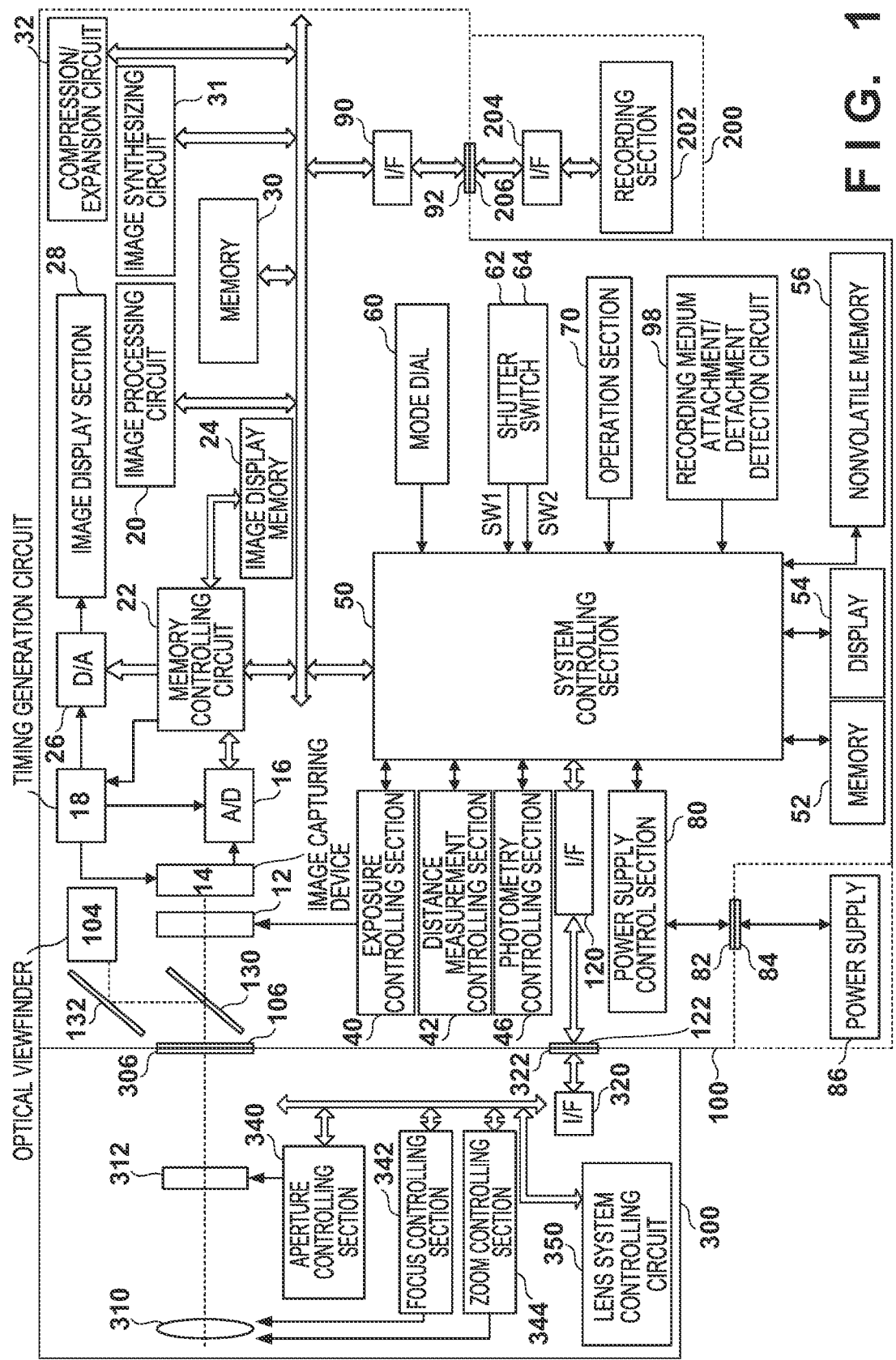
FIG. 1 is a block diagram of an image capturing apparatus serving as an example of a recording control apparatus according to the embodiment.

FIG. 1 is a block configuration diagram of an image capturing apparatus to which the embodiment is applied. As shown in the diagram, the apparatus is constituted by a camera main body 100 and an interchangeable lens type lens unit 300.

The lens unit 300 includes an imaging lens 310 constituted by a plurality of lenses, an aperture 312, and a lens mount 306 that mechanically couples the lens unit 300 to the camera main body 100. Various functions for electrically connecting the lens unit 300 to the camera main body 100 are included in the lens mount 306. The lens mount 306 includes an interface (I/F) 320 for connecting the lens unit 300 to the camera main body 100, and a connector 322 for electrically connecting the lens unit 300 to the camera main body 100.

The connector 322 has a function of mediating transmission and reception of a control signal, a status signal, a data signal, and the like between the camera main body 100 and the lens unit 300, and receiving currents at various voltages. Also, the connector 322 may be configured to perform communication using optical communication, voice communication, or the like, other than the electrical communication.

Also, the lens unit 300 includes an aperture controlling section 340, a focus controlling section 342, a zoom controlling section 344, and a lens system controlling circuit 350. The aperture controlling section 340 controls the aperture 312 based on photometry information from a photometry controlling section 46 of the camera main body 100, in cooperation with a later-described exposure controlling section 40 that controls a shutter 12 of the camera main body 100. The focus controlling section 342 controls focusing of the imaging lens 310. The zoom controlling section 344 controls zooming of the imaging lens 310. Also, the lens system controlling circuit 350 performs overall control on the lens unit 300. The lens system controlling circuit 350 includes a memory 52 for temporarily storing a constant, a variable, a program for operations, and the like. Furthermore, the lens system controlling circuit 350 includes a nonvolatile memory 56 for storing identification information such as a number unique to the lens unit 300, management information, function information such as a maximum aperture, a minimum aperture, and a focal length, current and past setting values, a program for operations, and the like.

Next, the configuration of the camera main body 100 will be described. The camera main body 100 includes a lens mount 106 for mechanically coupling the camera main body 100 and the lens unit 300. A light beam that has entered the lens unit 300 is reflected by mirrors 130 and 132, and is guided to an optical viewfinder 104. Note that the mirror 130 may be configured as either a quick return mirror or a half mirror. Also, the camera main body 100 is provided with a focal plane type shutter 12 and an image capturing device 14, and an optical element 14a such as an optical low-pass filter is arranged in front of the image capturing device 14. Note that the image capturing device 14 is a CCD or CMOS sensor, and photoelectrically converts a subject image.

The light beam that has entered the imaging lens 310 is guided through the aperture 312, which functions as light amount limiting means in a single-lens reflex type system, the lens mounts 306 and 106, the mirror 130, and the shutter 12, and forms an image on the image capturing device 14 as an optical image.

An A/D converter 16 converts an analog signal (output signal) output from the image capturing device 14 to a digital signal. A timing generation circuit 18 supplies a clock signal and a control signal to each of the image capturing device 14, the A/D converter 16, and a D/A converter 26, and is controlled by a memory controlling circuit 22 and a system controlling section 50.

An image processing circuit 20 performs predetermined pixel interpolation processing and color conversion processing on data from the A/D converter 16 or data from the memory controlling circuit 22. Also, the image processing circuit 20 performs predetermined computation processing using image data output from the A/D converter 16, as necessary. The system controlling section 50 can perform contrast-type automatic focusing (AF) processing, automatic exposure (AE) processing, and flash pre-emission (EF) processing for controlling the exposure controlling section 40 and a distance measurement controlling section 42 based on the obtained computation result. Moreover, the image processing circuit 20 performs predetermined computation processing using image data output from the A/D converter 16, and performs TTL-type automatic white balance (AWB) based on the obtained computation result as well.

The memory controlling circuit 22 controls the A/D converter 16, the timing generation circuit 18, the image processing circuit 20, an image display memory 24, a D/A converter 26, a memory 30, and a compression/expansion circuit 32. The image data output from the A/D converter 16 is written into the image display memory 24 or the memory 30 via the image processing circuit 20 and the memory controlling circuit 22, or via only the memory controlling circuit 22.

The display image data stored in the image display memory 24 is converted to an analog signal by the D/A converter 26, and the analog signal is supplied to, and displayed in, an image display section 28. The image display section 28 is a TFT-type LCD, for example. An electronic viewfinder (EVF) function can be realized by successively displaying captured image data in the image display section 28. Also, the display of the image display section 28 can be turned on and off according to an instruction from the system controlling section 50, and the power consumption of the camera main body 100 can be substantially reduced when the display is turned off.

The memory 30 is a memory for storing shot still images or moving images, and has a sufficient memory capacity for storing a predetermined number of still images or a predetermined amount of moving images. Accordingly, it is possible to write a large amount of images to the memory 30 at a high speed, even in continuous shooting or panoramic shooting in which a plurality of still images are successively shot. Also, the memory 30 is used as a frame buffer of images that are successively written at a predetermined rate when a moving image is shot. Also, the memory 30 can also be used as a work area of the system controlling section 50.

An image synthesizing circuit 31 generates one composite photograph by combining a plurality of images. Therefore, the image synthesizing circuit 31 reads out a plurality of pieces of image data written into the memory 30 at the same time, performs composite processing inside the circuit, and writes the generated composite image data to the memory 30. An object with respect to which composition is to be performed is image data that has been converted by the A/D converter 16 and written by the memory controlling circuit 22, and image data subjected to image processing performed by the image processing circuit 20.

The compression/expansion circuit 32 performs compression (encoding) and expansion (decoding) of image data using a known compression method. The compression/expansion circuit 32 reads out an image stored in the memory 30, performs compression processing or expansion processing on the readout image, and again writes the data subjected to the processing to the memory 30. Also, the compression/expansion circuit 32 also has a function of compression-encoding moving image data to data in a predetermined format, or obtaining a moving image signal by expanding given compression-encoded data.

The exposure controlling section 40 controls the shutter 12 in cooperation with the aperture controlling section 340 that controls the aperture 312 based on photometry information from the photometry controlling section 46. The distance measurement controlling section 42 performs AF (autofocus) processing. Therefore, the distance measurement controlling section 42 measures the focusing state of an image that has been formed as an optical image by guiding the light beam that has entered into the imaging lens 310 in the lens unit 300 via the aperture 312, the lens mounts 306 and 106, the mirror 130, and a focus adjustment sub-mirror (not illustrated) in a single-lens reflex manner.

The photometry controlling section 46 performs AE (automatic exposure) processing. Therefore, the photometry controlling section 46 measures the exposure condition of an image that has been formed as an optical image by guiding the light beam that has entered into the imaging lens 310 in the lens unit 300 via the aperture 312, the lens mounts 306 and 106, the mirror 130, and a photometry sub-mirror (not illustrated) in a single-lens reflex manner.

Also, the photometry controlling section 46 may perform the AF control using a result of measurement performed by the distance measurement controlling section 42, and a computation result obtained by the image processing circuit 20 performing computation on image data from the A/D converter 16. Moreover, exposure control may be performed using the result of measurement performed by the photometry controlling section 46, and a computation result obtained by the image processing circuit 20 performing computation on image data from the A/D converter 16.

The system controlling section 50 performs overall control on the camera main body 100, and is constituted by a known CPU or the like. The nonvolatile memory 56 stores programs to be executed by the CPU of the system controlling section 50 and the like. The system controlling section 50 performs control on the sections of the image capturing apparatus, computation processing, recording control processing for recording data to the recording medium 200, and the like based on the program read out from the nonvolatile memory 56.

A display section 54 functions as a notification section that notifies an external apparatus of an operating condition, a message, and the like using a character, an image, and a sound in accordance with execution of a program by the system controlling section 50. The display section 54 may include a sound generation element that performs notification using a sound, or the like, in addition to an LCD or LED that performs visual display, for example. Also, the display section 54 is installed in a single or a plurality of areas, which can be easily viewed, in the vicinity of an operation section 70 of the camera main body 100. Also, some functions of the display section 54 are implemented in the optical viewfinder 104.

Items that are to be displayed in the display section 54 include following items that are to be displayed in an image display section such as an LCD. First, items relating to the shooting mode such as single/continuous shooting and self-timer shooting are displayed. Also, items relating to recording are displayed such as compression rate, the number of pixels to be recorded, the number of recorded images, and the remaining number of images that can be shot. Also, items relating to shooting conditions are displayed such as shutter speed, f-stop, exposure correction, light modulation correction, the light emission amount of an external flash, and red-eye softening. Other items to be displayed include items relating to macro shooting, a buzzer setting, a remaining battery amount, an error, information using a plurality of digits, and an attached/detached state of a recording medium 200. Moreover, items to be displayed also include items relating to the attached/detached state of the lens unit 300, the operating condition of the communication I/F, date and time, and the connection state with an external computer.

Also, items that are to be displayed in the display section 54 include, for example, following items that are to be displayed in the optical viewfinder 104. The items to be displayed include items indicating the focus state, completion of shooting preparation, camera shake warning, flash charging undergoing, completion of flash charging, shutter speed, f-stop, exposure correction, and the writing operation to a recording medium.

The nonvolatile memory 56 is an electrically erasable and recordable memory medium that stores a later-described program and the like, and is an EEPROM, for example.

The reference signs 60, 62, 64, and 70 each indicate operation means for inputting various operation instructions to the system controlling section 50, and are constituted by a single or combination of a switch, a dial, a touch panel, a pointing device using sight line detection, and a voice recognition device. Here, these operation means will be specifically described.

With the mode dial switch 60, various functional shooting modes can be switched and set such as an automatic shooting mode, a program shooting mode, a shutter speed priority shooting mode, an aperture priority shooting mode, a manual shooting mode, and a depth of focus priority (depth) shooting mode. In addition, various functional shooting modes can also be switched and set such as a portrait shooting mode, a scenery shooting mode, a close-up shooting mode, a sport shooting mode, a night view shooting mode, and a panoramic shooting mode.

While a shutter button, which is not illustrated, is being operated (pressed half-way, for example), the shutter switch 62 (SW1) is turned on, and functions as a switch for instructing to start operations such as AF processing, AE processing, AWB processing, and EF processing.

When the operation of the shutter button, which is not illustrated, is completed (pressed fully, for example), the shutter switch 64 (SW2) is turned on, and functions as a switch for instructing to start operations of a series of processing constituted by exposure processing, developing processing, and recording processing. First, in the exposure processing, signals read out from the image capturing device 14 are written into the memory 30, as image data, via the A/D converter 16 and the memory controlling circuit 22. Also, the developing processing is performed on the image data using computations in the image processing circuit 20 and the memory controlling circuit 22. Also, in the recording processing, image data is read out from the memory 30, and is subjected to compression processing performed by the compression/expansion circuit 32, and the compressed data is written into a recording medium 200.

The operation section 70 is constituted by various buttons, a touch panel, and the like. For example, the operation section 70 includes a live view start/stop button, a moving image recording start/stop button, a menu button, a set button, a multi-screen reproduction page feed button, a flash setting button, a button for switching between single, continuous, and self-timer shootings, and a menu movement +/– button. Also, the operation section 70 also includes a reproduction image movement + (plus) button, a reproduction image movement – (minus) button, a shooting image quality selection button, an exposure correction button, a light modulation adjustment button, a setting button of the light emission amount of the external flash, a data and time setting button, and the like. Note that the selection of values and functions, which are functions of the aforementioned plus button and minus button, can be made smooth by including a rotational dial switch.

Also, the operation section 70 includes an image display ON/OFF switch for setting ON/OFF of the image display section 28, a quick review ON/OFF switch for setting a quick review function of automatically reproducing image data generated by shooting immediately after the shooting. Also, a compression mode switch is included, which is a switch for selecting the compression rate in JPEG compression or selecting a RAW mode in which the signal from the image capturing device is digitized as is, and the digitized data is recorded in a recording medium. Also, an AF mode setting switch with which a one-shot AF mode or a servo AF mode can be set is included. In the one-shot AF mode, when the shutter switch 62 (SW1) is pressed, an autofocus operation is started, and if the subject is brought into focus, the focusing state is retained. In the servo AF mode, while the shutter switch 62 (SW1) is pressed, the autofocus operation is successively performed.

The power supply control section 80 is constituted by a battery detection circuit, a DC/DC converter, a switch circuit for switching the block to which power is supplied, and the like. The power supply control section 80 detects whether or not a battery is attached, the type of the battery, and the remaining battery amount, controls the DC/DC converter based on the detection result and the instruction from the system controlling section 50, and supplies necessary voltages to the units including the recording medium for necessary periods.

The reference signs 82 and 84 indicate connectors, and the reference sign 86 indicates a power supply section constituted by a primary battery such as an alkaline battery or a lithium battery, a secondary battery such as a NiCd battery, a NiMH battery, a Li-ion battery, or a Li polymer battery, an AC adapter, or the like.

The reference sign 90 indicates an interface with a recording medium such as a memory card or a hard disk, or with a PC, and the reference sign 92 indicates a connector for connecting to a recording medium such as a memory card or a hard disk, or to a PC. The reference sign 98 indicates a recording medium attachment/detachment detection circuit for detecting whether or not the recording medium 200 is attached to the connector 92. The interface and the connector can be constituted by devices that conform to various memory medium standards. A PCMCIA (Personal Computer Memory Card International Association) card, a CF (Compact Flash (registered trademark)) card, and an SD card are included, for example. When the interface 90 and the connector 92 are constituted by the devices that conform to the PCMCIA card or CF card standard, various types of communication cards can be connected. The communication cards include a LAN card, a modem card, a USB (Universal Serial Bus) card, and an IEEE (Institute of Electrical and Electronic Engineers) 1394 card. In addition, a P1284 card, a SCSI (Small Computer System Interface) card, a PHS, and the like are included. As a result of connecting these communication cards, image data and management information associated with the image data can be transmitted and received to and from peripheral devices such as another computer and a printer.

The optical viewfinder 104 is for a user to visually recognize the light beam that has entered the imaging lens 310 as an optical image, by guiding the light beam to the optical viewfinder 104 via the aperture 312, the lens mounts 306 and 106, and mirrors 130 and 132, in a single-lens reflex manner. With this, shooting is possibly using only the optical viewfinder without using the electronic viewfinder function of the image display section 28. Also, some functions of the display section 54 such as displaying a focusing state, a camera shake warning, a charging state, the shutter speed, the f-stop, information relating to exposure correction are implemented in the optical viewfinder 104.

An interface 120 is an interface for electrically connecting the camera main body 100 to the lens unit 300 inside the lens mount 106. A connector 122 is for electrically connecting the camera main body 100 to the lens unit 300. Also, whether or not the lens unit 300 is attached to the lens mount 106 and the connector 122 is detected by a lens attachment/detachment detection unit, which is not illustrated. The connector 122 is for transmitting and receiving a control signal, a status signal, a data signal, and the like between the camera main body 100 and the lens unit 300, and also has a function of supplying currents at various voltages. Also, the connector 122 may be configured to perform communication through optical communication or voice communication, in addition to the electrical communication.

The recording medium 200 is a memory card in the present embodiment, and includes a recording section 202 constituted by a semiconductor memory, an interface section 204, which is an interface with the camera main body 100, and a connector 206 for connecting to the camera main body 100.

The configuration of the image capturing apparatus constituted by the camera main body 100 and the lens unit 300 in the embodiment has been described.

Recording Medium 200

In the present embodiment, a memory card (SD card) conforming to the SD standard defined by the SD card association is assumed to be used as the recording medium 200. Also, the memory card is recorded using a writing method (speed class writing) that follows the speed class specification in the SD standard. The speed class specification is a specification in which the minimum speed when data is successively recorded to a recording medium is assured.

In the speed class writing, the recording area (user area) is managed in units of AU (Allocation Unit). One AU includes a plurality of RUs (Recording Units). The size of RU differs depending on the type of the card (SDSC, SDHC, SDXC) and the type of the speed class, but according to the current specification, the size is a multiple of 16 KB, and the maximum size is 512 KB. The RU has a size that is integral multiple of the cluster (minimum management unit) of a recording medium. The speed class writing is only performed on an empty AU in which data is not recorded (AU not including RU in which data is recorded). On the other hand, the AU including RU in which data is recorded is referred to as a fragmented AU.

Note that the present embodiment can be applied to a recording apparatus that uses a recording medium conforming to another standard which supports a writing method whose management unit of the recording area is different from the AU. One example of such a recording medium is a CF card. In the CF card, VPG (Video Performance Guarantee) is defined as a writing method for assuring the minimum recording speed.

Hereinafter, the operations of the image capturing apparatus of the present embodiment will be described with reference to FIGS. 2 to 4.

Speed Class Writing of Recording Medium 200

Figure 2A:
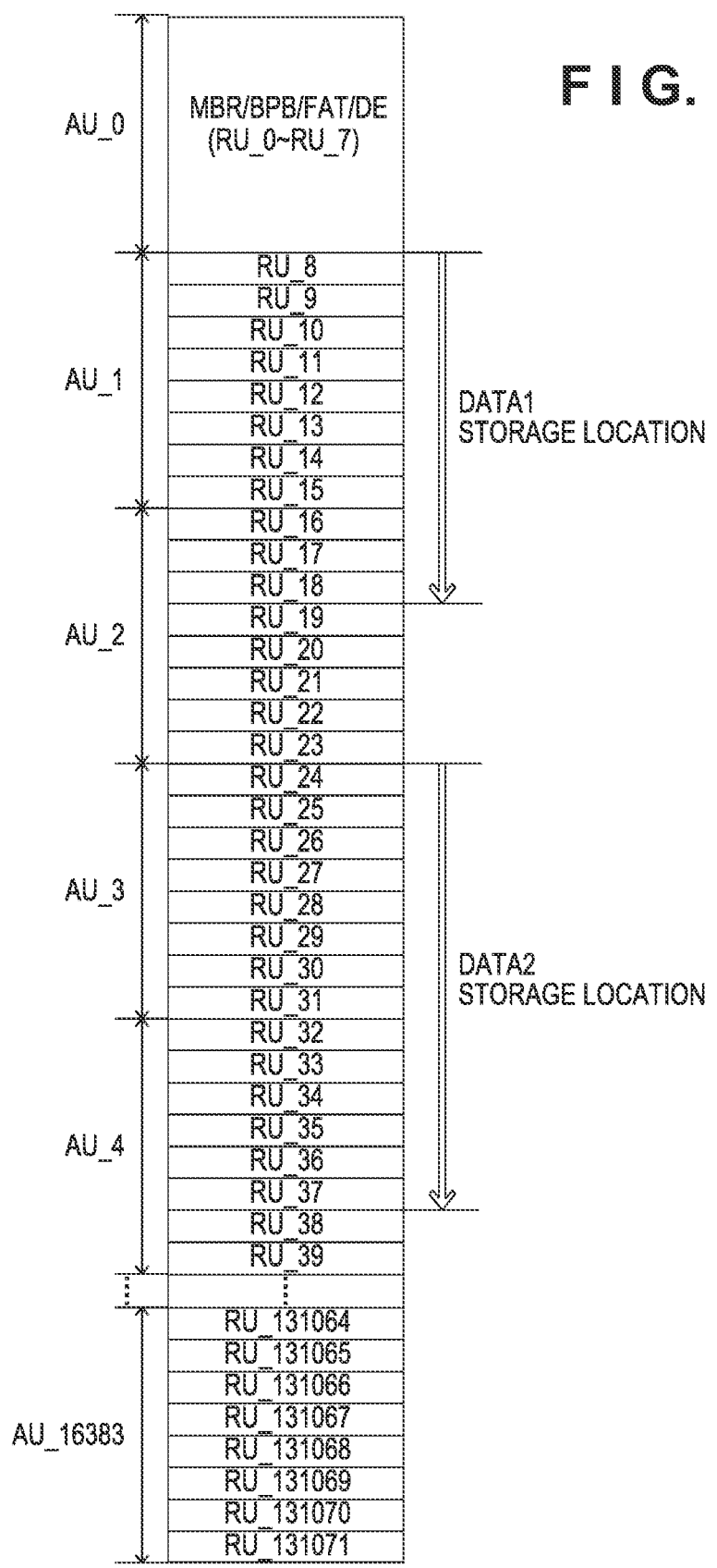
FIGS. 2A and 2B are logical address maps of a recording medium 200.
Figure 2B:
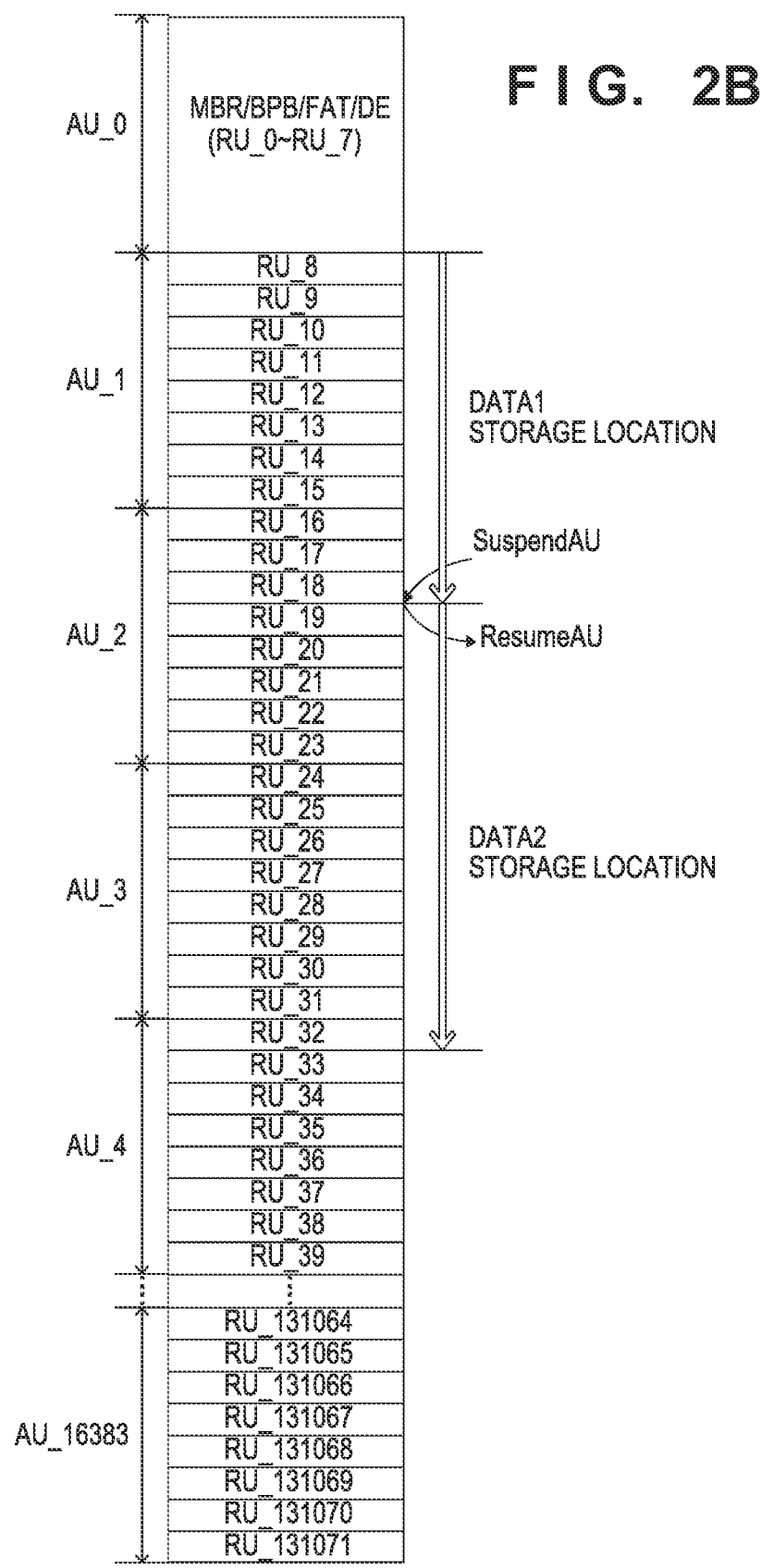

First, FIGS. 2A and 2B will be described. FIGS. 2A and 2B each schematically illustrate a logical address map of a recording section 202 in a recording medium 200, in which the concepts of AU and RU are considered. The number of RUs and AUs differs depending on the recording medium, and it is assumed that the recording section 202 of the recording medium 200 of the present embodiment includes 131072 RUs of $0^{th}$ (RU_0) to $131071^{th}$ (RU_131071) AUs. Also, it is assumed that one AU includes eight RUs, and 16384 AUs of $0^{th}$ (AU_0) to $16383^{th}$ (AU_16383) AUs are included.

AU_0 (RU_0 to RU_7) is used as a management area, and system information is recorded therein. Here, MBR (Master Boot Record), BPB (BIOS Parameter Block), FAT (File Allocation Table), and DE (Directory Entry) are shown as examples of the system information. However, there is no limitation thereto. Note that, since the system information illustrated here is known, the detailed description thereof will be omitted. Also, AU_1 to AU_16383 (RU_8 to RU_131071) are used as a data recording area for recording data.

The difference between the method of using RUs in AU when conventional speed class writing is performed and the method of using RUs in AU in single stream writing, which is used in a general video speed class (hereinafter referred to as VSC), will be described with reference to FIGS. 2A and 2B.

First, the RU usage sequence in the conventional speed class in FIG. 2A will be described. First, an empty AU in which no RU includes logical data is retrieved. This is to enable the recording medium to exert its maximum performance and to write data at a high speed by writing data to a fully empty AU, considering the property of the AU of the recording medium, as described above. Next, a write command is issued to the retrieved empty AU in units of RU, and data is written in units of RU size. Then, when all the RUs in the AU into which data is being written are fully written with data, the next fully empty AU is retrieved, and data is similarly written in units of RU. Recording is sequentially performed by repeating this operation, and writing of a first file (DATA1) is completed. When writing of data is completed, the operation is ended without issuing a specific command. When a second file (DATA2) is to be written, similarly to the control performed when the first file has been written, a fully empty AU is again retrieved, and data is written into the retrieved empty AU in units of RU. Here, no problem arises when the end position of the data of the first file (DATA1) is at the end of AU (last RU in the AU). In contrast, if the end position is not at the end of AU, that is, when writing of data is ended at an RU in the middle of the AU instead of the last RU, RUs (remaining RUs) in which no data is written remain in the AU. These remaining RUs in the AU are an area that cannot be used as a conventional speed class area, and cannot be used when the second file is written.

Next, the method of using RUs when VSC single stream writing is performed will be described with reference to FIG. 2B. First, with respect to the first file (DATA1), a fully empty AU is retrieved, and data is written into the empty AU in units of RU, similarly to the conventional speed class. Note that, before writing in units of RU is performed, a Set Free AU command is issued in order to declare an empty AU to be used to the recording medium in advance. In this Set Free AU, a plurality of AUs are designated in advance. In Set Free AU, up to eight AUs can be designated in advance. In VSC, if data is written into a location other than the AUs designated by this Set Free AU, this operation violates the restriction of VSC, and the speed cannot be ensured.

As a result of declaring empty AUs to be used by Set Free AU, the recording medium can be switched to a mode in which data can be successively written, by invalidating data remaining in the designated AUs even if previous data is present therein. There is a merit of preventing garbage collection due to fragmentation of the recording medium. However, since up to only eight AUs can be designated in advance by the Set Free AU command, when more AUs are to be used, the Set Free AU command needs to be issued again. There is a demerit that Set Free AU incurs a command overhead of 250 ms at maximum, and the recording apparatus cannot access the recording medium during the command overhead period.

In the VSC single stream, the recording medium is accessed and data is written into the recording medium by combining Set Free AU and a write command in units of RU. The control performed at the time when writing to the first file (DATA1) and following files is ended and writing to the next second file (DATA2) and the following files is started is substantially different from that of the conventional speed class. Specifically, when recording to the first file (DATA1) and following files ends, a Suspend AU command is issued, and when recording to the next second file (DATA2) and following files starts, a Resume AU command is issued. The Suspend AU command is a command for saving, in the recording medium, information regarding the empty RU next to the RU to which data has been recorded by a write command immediately before. That is, the position of the next empty RU to which data is to be written is saved in the recording medium. The Resume AU is a command, in the video speed class, for starting recording from the position of the RU saved in the recording medium by the Suspend AU command, that is, the RU position in the middle of AU, instead of the start position of AU. The information regarding the RU position is saved in the recording medium, and therefore the information can be retained even if the power supply to the recording medium is turned off and on. Also, by using an ACMD13 command, the image capturing apparatus can acquire the information regarding the RU position stored in the recording medium from the recording medium.

For example, in FIG. 2B, as a result of issuing the Suspend AU command after writing of DATA1 is ended, the position information of RU_19 is saved in the recording medium 200. Also, as a result of issuing the Resume AU command before starting writing of DATA2, writing can be started from RU_19.

As a result of using the Suspend AU command and the Resume AU command in this way, writing of data can be started at a remaining RU in the middle of AU. Therefore, a plurality of files can be recorded in successive RUs in one AU without generating a remaining RU.

Next, the concept of VSC multi-stream writing will be described (refer to "SD Specifications Part 1, Physical Layer, Simplified Specification, Version 5.00", which is a simplified specification provided by SDA, for details). Here, detailed description will be given regarding an Update Dir command and a Release Dir command relating to the VSC multi-stream writing.

First, in a conventional control method of speed class, the sector corresponding to Directory Entry on the file system of the generated file is registered in the recording medium by issuing the Update Dir command. As a result of registering this sector in advance, when a random access is performed on the recording medium, the reduction in speed can be minimized by performing specific control if the destination of the random access is the registered sector. Thereafter, after issuing the Set Free AU command and the like, Start Rec is called, which is a recording start command, and recording of data to the recording medium is started. A specific command is not issued at the end of recording data (file).

Next, the control method of multi-stream writing in the video speed class will be described. First, the sector corresponding to Directory Entry of a generated file is registered using Update Dir, similarly to the conventional case. Also, after issuing the Set Free AU command and the like, the Start Rec command is issued and video speed class control is started. Thereafter, a new file is generated, and recording of data in which the video speed class is applied is enabled with respect to the generated file in parallel with the previously generated file. Note that when the remaining capacity of the sector registered using Update Dir decreases, it is possible that the Directory Entry information of a new image file cannot be added to the registered sector. When the information cannot be added, it is necessary to register a sector to which the Directory Entry information is to be recorded to the recording medium by newly issuing Update Dir. It is specified in the standard that eight sectors at maximum can be registered at the same time in the video speed class with this Update Dir. Then, after the recording of Directory Entry of the file to the registered sector has been completed, the setting of the registered sector is released by issuing Release Dir, which is a command pairing with Update Dir. When the number of issuance of Release Dir is equal to the number of issuance of Update Dir, the video speed class is automatically ended.

Also, in multi-stream writing in the video speed class, in addition to a restriction imposed on command issuance, a restriction imposed on locations to which writing is performed is present (refer to "SD Specifications Part 1, Physical Layer, Simplified Specification, Version 5.00"). In the multi-stream writing, writing of a plurality of files is performed in a time sharing manner in order to achieve the assured minimum speed, as a whole, instead of assuring speed class for each file, and therefore, the writing destination needs to be successive areas. For example, when a file 1 of 64 MB of data is written to a 512 MB AU, instead of writing a file 2 to the next AU, the file 2 needs to be successively written to a location of the 512 MB after the 64 MB to which the file 1 has been written. When this restriction is not satisfied, video speed class is not assured, the video speed class is released, and the Start Rec command needs to be issued again.

When a plurality of files are recorded to the same AU, there is a problem in that, if one file is erased, the amount of free space, in a non-speed class, is increased by the erased amount, but the free space in the speed class in which a fully empty AU is required does not increase.

As described above, by performing the control, with respect to the method of using RUs and the file control method, that is different between the conventional speed class and the video speed class, the assured minimum speed is tripled in the video speed class. Also, it is possible to effectively use the free space, and the multi-stream writing is newly enabled. However, more commands must be issued compared with the conventional case, which is a restriction imposed for realizing these improvements. When a command is issued, an overhead is incurred, which increases the load of the system as a whole. Therefore, it is important to minimize the number of issuances of commands.

With the present embodiment, the reduction of the number of issuances of commands can be realized.

Successive Recording of Multiple Files

Figure 3A:
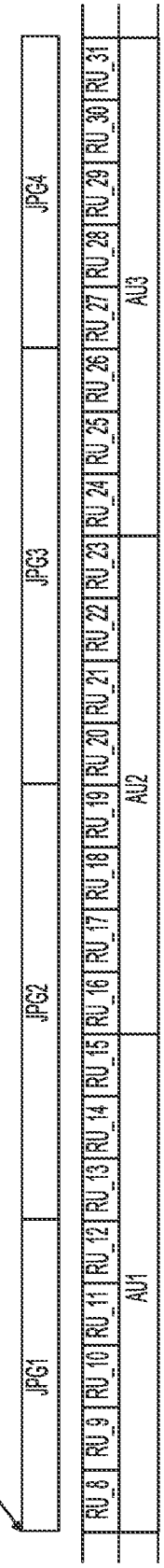
FIGS. 3A to 3C are diagrams illustrating recording processing for recording a plurality of image files.
Figure 3B:
Figure 3C:
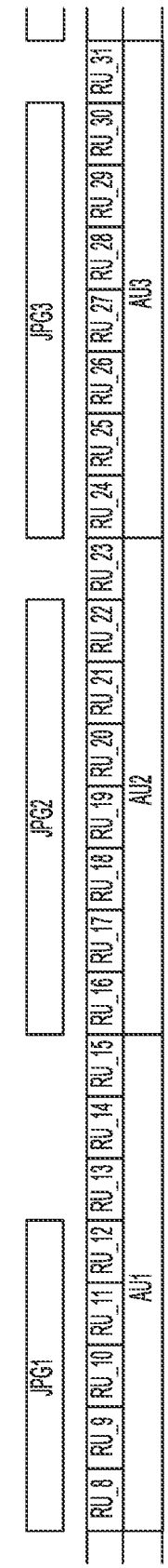

FIG. 3A illustrates the recording processing in the present embodiment in which multi-stream writing is applied when a plurality of image files are recorded. FIG. 3B illustrates a mode to which the recording processing using the Suspend AU command and the Resume AU command in the video speed class is applied. FIG. 3C is a mode to which the recording processing in the conventional speed class is applied.

The ultimate object of the processing illustrated in FIG. 3A is to minimize the number of issuance of Suspend AU and Resume AU at the end of each file and Start Rec by making use of the restriction that writing needs to be performed in successive areas when multi-stream writing is being performed. By generating a dummy file before the recording of the first image file (JPG1) is started, the multi-stream writing is realized.

The recording of still images has a property that each image ends separately, which is different from the moving image. When this property is applied to the video speed class and the conventional speed class as is, pieces of control as shown in FIGS. 3B and 3C are respectively performed.

In FIG. 3B, the commands of Suspend AU, Resume AU, and Start Rec need to be issued between files, which incurs a delay of two seconds at maximum. This operation is performed between images, and the burst performance substantially decreases.

In FIG. 3C, although Start Rec needs to be similarly issued, it is not necessary to issue the Suspend AU command and the Resume AU command. Instead, empty areas are generated between the files, and wasted areas are generated. It is shown that, in spite of originally securing an area in which four JPG files can be recorded, as in FIG. 3B, only three files are recorded in FIG. 3C.

With the methods in FIGS. 3B and 3C, as described above, the problems of command overhead and free space are respectively incurred. Here, the recording method in the present embodiment with which these problems are solved will be described with reference to FIG. 3A.

First, in a developing stage before a first image is recorded, a dummy file in which no data is recorded is generated in the same folder to which images are to be recorded as a base for multi-stream writing. Next, the recording medium is notified of Set Free AU and Start Rec, which are commands for entering the video speed class. With this, preparation of recording data such as developing processing and compression processing, and preparation of the recording medium itself, that is, absorption of the command overhead, can be performed in parallel.

Next, development is completed, and writing of JPG data generated by the compression/expansion circuit 32 is performed. Here, Update Dir and Release Dir need to be issued at the start of the processing, but Suspend AU and Resume AU need not be issued. This is because, since the dummy file that has been registered at first is present, even if writing of JPG data is completed, the video speed class continues without being terminated.

When the next JPG data, in continuous shooting, is written into the recording medium, the multi-stream state in the video speed class continues, and as a result, the next JPG data can be recorded in an area that is continuous with the previous JPG data, and a free space is not wasted.

That is, as a result of merely generating a dummy file in advance and registering the dummy file for enabling the video speed class before writing of a plurality of files is started, saving of free space and the increase in processing speed can be realized.

Recording Processing Flow of Image Capturing Apparatus in Continuous Shooting

Figure 4A:
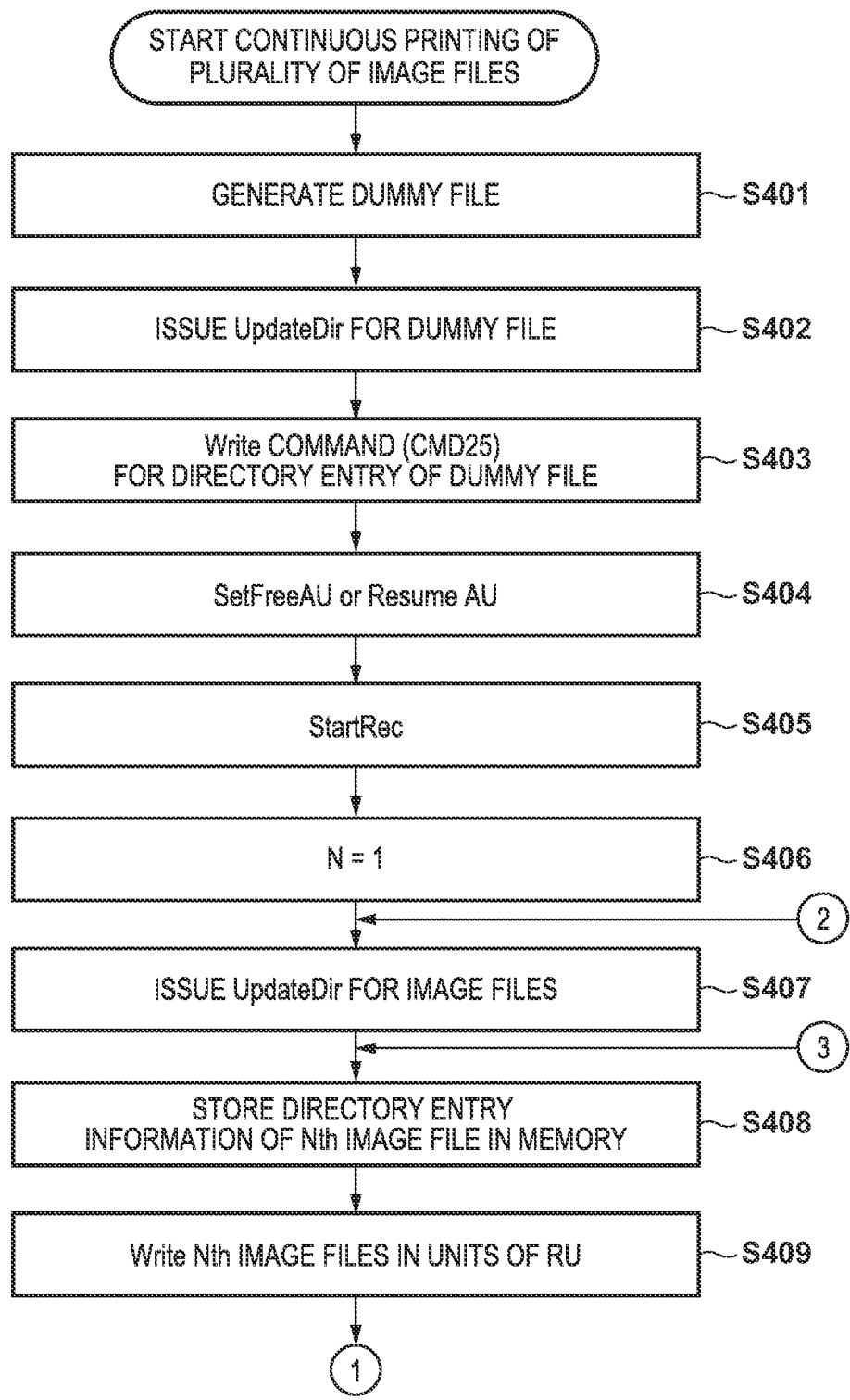
FIGS. 4A and 4B are flowcharts of recording processing in continuous shooting of the image capturing apparatus.
Figure 4B:
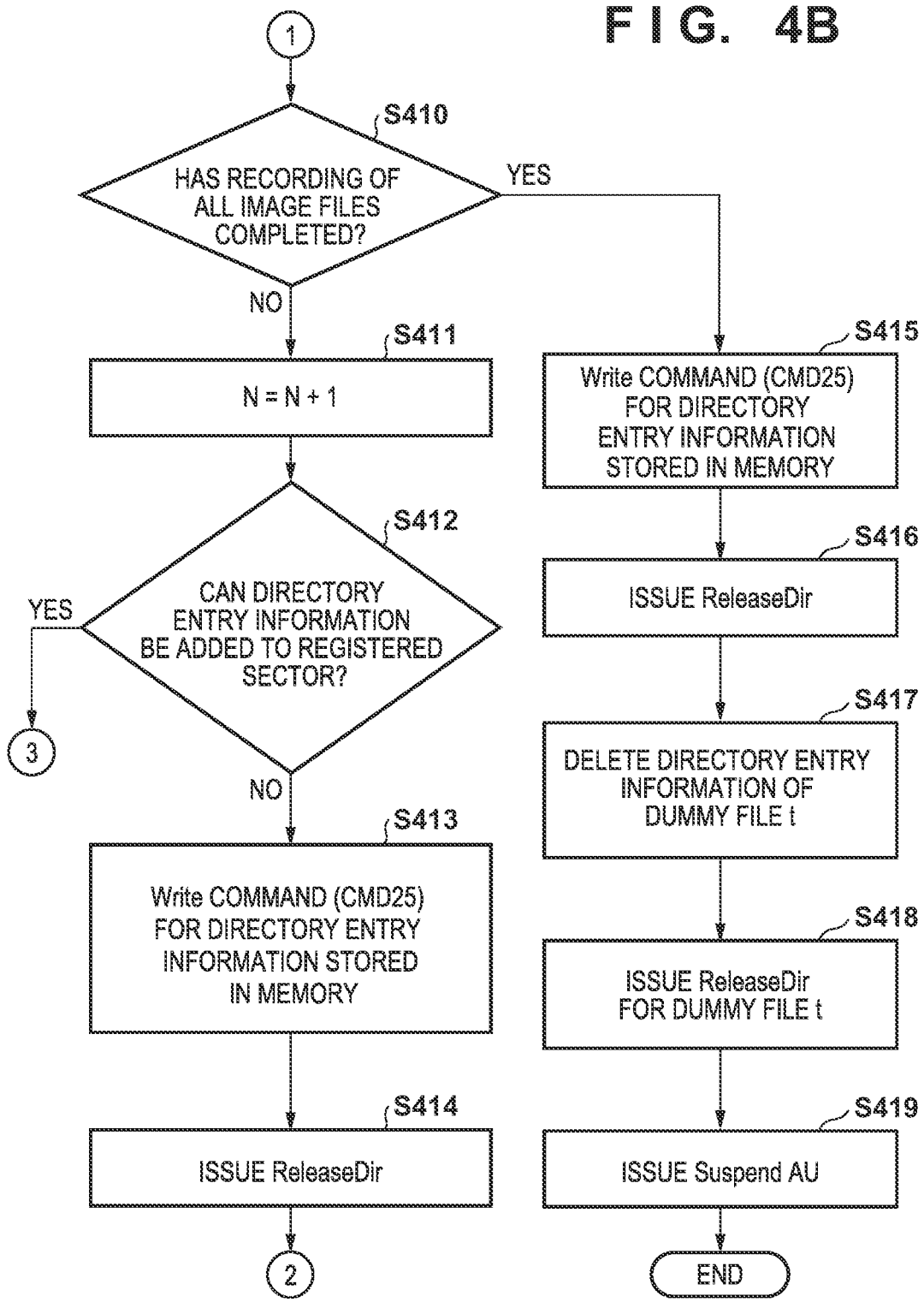

Next, the sequence of recording processing of the image capturing apparatus in continuous shooting will be described with reference to the flowcharts in FIGS. 4A and 4B. Note that the program corresponding to this flowchart is stored in the nonvolatile memory 56, and the processing of the flowchart is executed by the system controlling section 50 reading out this program from the nonvolatile memory 56, and performing processing based on the read-out program. This flowchart is started when the system controlling section 50 has detected that an instruction to start continuous shooting was input by an operation made to the shutter button in a continuous shooting mode. Also, when the processing of continuous shooting is started, capturing of an image by the image capturing device 14, image processing on captured image data by the image processing circuit 20, and compression processing on the image data by the compression/expansion circuit 32 are performed. With these pieces of processing, with respect to a plurality of images obtained by shooting in continuous shooting, an image file is generated for each image, and is temporarily stored in the memory 30. These pieces of processing are executed in parallel with the flows in FIGS. 4A and 4B. The flows in FIGS. 4A and 4B show the processing for recording the plurality of image files that have been obtained by continuous shooting and temporarily stored in the memory 30 to the recording medium 200.

First, in step S401, the system controlling section 50 generates a dummy file, and temporarily stores the dummy file in the memory 52. In generating this dummy file, only the directory entry information of the dummy file is generated without actually generating a file. Next, in step S402, the system controlling section 50 issues the Update Dir command to the recording medium 200 via the interface 90, and registers the sector to which the directory entry information of the dummy file is to be recorded, to the recording medium 200. Also, in step S403, the system controlling section 50 issues, to the recording medium 200 using a CMD 25, a recording command for recording the directory entry information of the dummy file generated in step S401 to the sector registered using Update Dir in step S402. With this, a dummy file (actually, only directory entry information) is generated in the recording medium 200. As described above, in the present embodiment, the processing for recording a dummy file (actually, only directory entry information) to the recording medium 200 is executed before the recording of a plurality of image files obtained by continuous shooting to the recording medium 200 is started.

Upon completing the processing regarding the dummy file, in step S404, the system controlling section 50 issues the Set Free AU command to the recording medium 200. As a result of issuing the Set Free AU command, which of AUs in the recording medium writing is to be performed to can be declared in advance, and the recording medium 200 can perform preparation for the writing. If the Suspend AU command has been issued before, and the position of RU at which recording is to be re-started is registered in the recording medium 200, it is also possible to issue the Resume AU command instead of Set Free AU. If the Suspend AU command has been issued before, and an RU position is recorded in the recording medium, recording is re-started from the RU position registered in the recording medium 200. Next, in step S405, the system controlling section 50 issues the Start Rec command to the recording medium 200. With the Start Rec command, the recording medium 200 can shift to the video speed class mode. The processing so far is processing that is executed before image files obtained in continuous shooting are recorded to the recording medium 200. It takes time to complete generation of an image file of a first image since the start of continuous shooting was instructed, because image processing, compression processing, and the like need to be performed, and therefore, even if the processing is executed after the start of continuous shooting has been instructed, the recording of the image files is scarcely delayed. Also, in the present embodiment, the command to start control in the video speed class is issued (steps S404 and S405) after performing processing for generating the dummy file (steps S401 to S403). However, processing for generating the dummy file (steps S401 to S403) may be performed after the command to start control in the video speed class was issued.

Next, in step S406, the system controlling section 50 performs initialization by setting one to a variable N in order to set such that the image file to be processed is a first image file. Thereafter, in step S407, the system controlling section 50 issues the Update Dir command to the recording medium 200. Here, with the Update Dir command, the sector to which the directory entry information of the image files that store images obtained by continuous shooting is recorded is registered in the recording medium 200.

In step S408, the system controlling section 50 generates directory entry information with respect to an $N^{th}$ image file that is temporarily stored in the memory 30, and temporarily stores the generated directory entry information in the memory 30. The recording of the directory entry information is recording to the sector registered by Update Dir using CMD 25, and if frequently performed, the processing speed decreases. Therefore, recording is not performed for each image file, and the directory entry information is temporarily stored in the memory 30 until the data size thereof reaches a maximum recordable size of the one sector registered by Update Dir.

Next, in step S409, the system controlling section 50 reads out the $N^{th}$ image file stored in the memory 30 in units of RU size, and successively records the read out data to successive RUs of the recording medium 200. Upon completing recording of the $N^{th}$ image file, in step S410, the system controlling section 50 determines whether or not recording of all of the plurality of image files obtained by continuous shooting to the recording medium 200 has completed. If it is determined that the recording has completed, the system controlling section 50 advances the processing to step S415, and if not, the system controlling section 50 advances the processing to step S411. In step S411, in order to start processing on the next image file, the system controlling section 50 adds one to the variable N such that the next image is set as the image to be processed. Next, in step S412, the system controlling section 50 compares the size of data that can be recorded to the sector registered by Update Dir and the size of the directory entry information that is temporarily stored in the memory 30. The system controlling section 50 determines whether or not the remaining size is sufficient for additionally recording the directory entry information of the $N^{th}$ image file. If it is determined that the remaining size is not sufficient, the system controlling section 50 advances the processing to step S413, and performs processing for collectively recording all pieces of the directory entry information of the plurality of image files that are temporarily stored in the memory 30. If it is determined that the remaining size is sufficient, the system controlling section 50 returns the processing to step S408, starts the processing for the next Nth image file, and repeats processing in step S408 onward, without recording the directory entry information.

In step S413, the system controlling section 50 records the pieces of directory entry information of the plurality of image files that are stored in the memory 30 to the sector, of the recording medium 200, that has been registered in step S407 using CMD 25. Next, in step S414, the system controlling section 50 issues, to the memory medium 200, Release Dir for deleting the registration of the sector to which directory entry information has been recorded, the sector having been registered in step S407. Thereafter, the system controlling section 50 returns the processing to step S407, registers, in step S407, the sector to which directory entry information is to be recorded next, and starts processing for the next $N^{th}$ image file from step S408.

In this way, the system controlling section 50 repeatedly executes the processing from step S407 to step S414 until all the image files obtained by continuous shooting have been recorded.

If it is determined that recording of all of the image files obtained by continuous shooting has completed in step S410, the processing in step S415 is executed. In step S415, the system controlling section 50 records the directory entry information stored in the memory 30 to the registered sector of the recording medium 200 using CMD 25, similarly to step S413. Thereafter, in step S416, the system controlling section 50 issues the Release Dir command for releasing registration of the sector registered in step S407 to the recording medium 200, similarly to step S414.

Thereafter, in step S417, the system controlling section 50 deletes the directory entry information of the dummy file recorded in the recording medium 200 in step S403 from the recording medium 200. Then, in step S418, the system controlling section 50 issues the Release Dir command for releasing registration of the sector registered for the dummy file in step S402. Finally, in step S419, the system controlling section 50 issues the Suspend AU command to the recording medium 200, registers the position of RU to which recording is to be started next to the recording medium 200, and ends the video speed mode by issuing this command.

With the method described above, a control method can be realized with which the recording medium can exert its maximum performance. That is, a well-balanced recording method can be provided in which the number of times of issuing commands is minimized for recording, in the video speed class, a plurality of image files in successive areas, and a wasted area in the recording medium is minimized.

Note that an example in which a plurality of still image files obtained by continuous shooting are successively recorded is described in the flowcharts in FIGS. 4A and 4B, but the same method can be applied to the case where a plurality of moving image files are successively recorded.

Also, in the above-described embodiment, directory entry information of a dummy file is recorded to the recording medium 200, as the processing for generating the dummy file, before the recording of an image file is started. However, the configuration may be such that sectors that are not to be used are registered in advance by issuing the Update Dir command for a dummy file, without recording the directory entry information of the dummy file. Alternatively, the configuration may be such that the registration of a sector registered by the Update Dir command for an image file is not released, without performing processing for generating a dummy file, or performing registration of a sector for a dummy file by the Update Dir command. The video speed class can continue with such processing. As a result of configuring such that the registration of at least one sector is not released with respect to the sectors registered by the Update Dir command, recording processing can be continued to successive recording areas (RUs), in the video speed class, without using the Suspend AU command and the Resume AU command.

Also, in the above-described embodiment, the registration of a sector registered by the Update Dir command is released at a point in time when the recording of directory entry information to the sector has been completed. However, the configuration may be such that, without releasing registration of a registered sector at a timing at which recording of information to the registered sector has been completed, the registration of a plurality of registered sectors is released at a timing at which recording of all image files has been completed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-161163, filed Aug. 30, 2018 and Japanese Patent Application No. 2018-162101, filed Aug. 30, 2018 which are hereby incorporated by reference herein in their entirety.

What is claimed is:

1. A recording control apparatus comprising:
   a recording controlling section for recording an image shot by an image capturing section to a recording medium,
   wherein the recording controlling section, when a plurality of images that are successively shot by the image capturing section are to be recorded to the recording medium as a plurality of files, executes predetermined processing for enabling recording of the plurality of files to successive areas of the recording medium without using a predetermined command, before starting recording of the plurality of images.

2. The recording control apparatus according to claim 1, wherein the recording controlling section executes the predetermined processing for enabling recording of the plurality of files to successive areas of the recording medium in a state in which a predetermined speed class continues, without using the predetermined command for enabling recording of the plurality of files to successive areas of the recording medium in a state in which the predetermined speed class continues.

3. The recording control apparatus according to claim 2, wherein the recording medium is a memory card conformable to the SD standard, and
   wherein the predetermined speed class is a video speed class.

4. The recording control apparatus according to claim 2, wherein the predetermined speed class is a speed class in which the recording speed is assured by performing recording in units of a second recording unit including a plurality of first recording units, and
   wherein, as a result of using the predetermined command in the predetermined speed class, recording of a next file can be started from the first recording unit in a middle of the second recording unit.

5. The recording control apparatus according to claim 1, wherein the predetermined command includes a first command and a second command, and
   wherein the recording medium is a recording medium in which a plurality of files can be recorded to successive areas of the recording medium by accepting the first command when recording of a file is ended, and accepting the second command when recording of a next file is started.

6. The recording control apparatus according to claim 5, wherein the first command is a command for storing, to the recording medium, position information indicating the position of a first recording unit next to the first recording unit to which data has been recorded, and the second command is a command for, by giving notice of the position information stored in the recording medium, enabling recording of data at a position of a first recording unit indicated by the position information.

7. The recording control apparatus according to claim 4, wherein the recording medium is a memory card conformable to the SD standard, and
   wherein the first recording unit is RU (Recording Unit), and the second recording unit is AU (Allocation Unit).

8. The recording control apparatus according to claim 5, wherein the recording medium is a memory card conformable to the SD standard, and
   wherein the first command is Suspend AU, and the second command is Resume AU.

9. The recording control apparatus according to claim 1, wherein the predetermined processing is processing for generating a dummy file in the recording medium.

10. The recording control apparatus according to claim 9, wherein the recording controlling section records system information of the dummy file in a management area of the recording medium, and does not record data of the dummy file to a data recording area of the recording medium.

11. The recording control apparatus according to claim 10, wherein the recording controlling section erases, from the recording medium, system information of the dummy file recorded in the recording medium in the predetermined processing, in response to completion of recording of the plurality of images as the plurality of files.

12. The recording control apparatus according to claim 1, wherein the recording controlling section
   issues, in order to enable recording of system information of a file to be recorded to the recording medium to a management area in the recording medium, in a state in which the predetermined speed class continues, a third command, to the recording medium, for registering, to the recording medium, a position in the management area at which the system information is to be recorded, and
   issues, to the recording medium, in the predetermined processing, before recording of the plurality of images to the recording medium as a plurality of files is started, the third command for registering a position at which system information of the plurality of files is not to be recorded, which is different from the position in the management area at which the system information of the plurality of files are to be recorded.

13. The recording control apparatus according to claim 12, wherein the recording controlling section, after having executed the predetermined processing, issues a command for starting control in the predetermined speed class to the recording medium.

14. The recording control apparatus according to claim 13, wherein the recording controlling section, after having issued a command for starting control in the predetermined speed class, issues the third command for registering a position in a management area at which system information of the plurality of files is to be recorded to the recording medium.

15. The recording control apparatus according to claim 12, wherein the recording controlling section can issue a fourth command for releasing registration of the position in the management area, which has been registered by the third command, and
wherein, the recording controlling section also issues the fourth command for releasing registration of the position in the management area at which system information of the plurality of files is to be recorded, before recording of the plurality of files is completed, but does not issue the fourth command for releasing registration of the position at which the system information of the plurality of files is not to be recorded, before recording of the plurality of files is completed.

16. A control method of a recording control apparatus for recording an image shot by an image capturing section to a recording medium, the control method comprising:
executing, when a plurality of images that are successively shot by the image capturing section are to be recorded to the recording medium as a plurality of files, predetermined processing for enabling recording of the plurality of files to successive areas of the recording medium without using a predetermined command, before recording of the plurality of images is started.

17. A non-transitory computer-readable storage medium storing a program which, when read and executed by a computer, caused the computer to execute the steps of a control method of a recording control apparatus for recording an image shot by an image capturing section to a recording medium, the control method comprising:
executing, when a plurality of images that are successively shot by the image capturing section are to be recorded to the recording medium as a plurality of files, predetermined processing for enabling recording of the plurality of files to successive areas of the recording medium without using a predetermined command, before recording of the plurality of images is started.

\* \* \* \* \*